United States Patent [19]

Yamagishi et al.

[11] 4,025,692

[45] May 24, 1977

[54] METHOD FOR FORMING CORROSION-RESISTANT COATING ON A STEEL SHEET

[75] Inventors: Hidehisa Yamagishi, Yokohama; Atuhiko Murao, Kawasaki; Hisao Tsutsumi, Yokohama, all of Japan

[73] Assignee: Nippon Kokan Kabushiki Kaisha, Tokyo, Japan

[22] Filed: June 10, 1975

[21] Appl. No.: 585,489

[30] Foreign Application Priority Data

June 17, 1974 Japan .............................. 49-68942

[52] U.S. Cl. ............................. 428/418; 148/6.16; 260/29.6 MM; 260/29.6 MP; 260/836; 427/44; 427/54; 428/463
[51] Int. Cl.$^2$ ............................................ B05D 3/06
[58] Field of Search ........... 260/29.6 MM, 45.75 R, 260/836, 29.6 MP; 428/418, 461, 463; 148/6.16, 6.2; 427/44, 54

[56] References Cited

UNITED STATES PATENTS

| | | | |
|---|---|---|---|
| 3,132,055 | 5/1964 | Tanaka et al. | 148/6.16 |
| 3,175,964 | 3/1965 | Watanabe et al. | 148/6.16 |
| 3,262,903 | 7/1966 | Robertson | 148/6.16 |
| 3,519,495 | 7/1970 | Plaxton | 148/6.16 |
| 3,528,860 | 9/1970 | Kronstein | 148/6.16 |
| 3,674,545 | 7/1972 | Strolle | 427/44 |
| 3,754,972 | 8/1973 | Majistre et al. | 427/44 |
| 3,873,349 | 3/1975 | Kimura et al. | 148/6.16 |

*Primary Examiner*—John H. Newsome
*Attorney, Agent, or Firm*—Flynn & Frishauf

[57] ABSTRACT

A steel sheet coating having high corrosion-resistivity and paint-adhesivity can be obtained by applying a water solution of specific composition described hereinafter on a steel sheet, followed by drying; and exposing the coating to ultraviolet rays in an air atmosphere; said water solution contains a chemical compound which has been prepared by reacting a prepolymer of an epoxy resin with acrylic acid or methacrylic acid in order to introduce vinyl groups into the molecules of said prepolymer, another chemical compound of chromate or dichromate for chelation and a molybdenum compound as a stabilizer.

17 Claims, No Drawings

METHOD FOR FORMING CORROSION-RESISTANT COATING ON A STEEL SHEET

This invention relates to a method for forming a corrosion-resistant coating on a steel sheet such as raw steel sheet, galvanized steel sheet or tinned steel sheet.

When manufacturing a coated steel such as galvanized or tinned steel sheet, the raw steel sheet is generally treated with a solution of chromate or phosphate to form a substrate coating for the primary object of preventing the surface of the raw steel sheet from being rusted during storage.

In many cases, these coated steel sheets are fabricated into any shaped article by means of pressing, rolling or welding. In this case, press-oil or any other stain adhered to the surface of the article should be removed by degreasing in order to attain satisfactory painting. The already formed chromium coating is liable to be dissolved away to a certain extent into the basic degreasing solution used, often resulting in that the coated steel becomes rusty before painting, and further fails to form a substrate for a painted coating due to the fall of paint adhesivity.

Therefore, it has often been necessary to perform such substrate treatment again by means of phosphate treatment before painting.

There have been proposed several improved methods for the above-mentioned chromate-treating characterized by using an organic substance. For example, U.S. Pat. Nos. 3,175,964 and 3,132,055, and British Pat. No. 988,534 reveal these improved methods, respectively. All of these improved methods comprise coating a metal surface with a specific water solution containing a mixture of chromic acid anhydride or chromate and a water soluble high molecular resinous material; applying thermal drying to render the coated layer corrosion-resistant. However, the high molecular substance contained in the coated layer can not be easily insolubilized by the above-mentioned drying, making it substantially impossible to form a perfect water-resistant coating on a metal surface. A steel sheet, the surface of which is coated with such an imperfect water-resistant material, tends to give rise to the growth of blistering scars on the painted layer applied to said coated surface.

The high molecular resins used in the methods of the above-mentioned U.S. and British Patents are so stable that neither fresh polymerization nor crosslinking is expected to occur between their molecules. The inability of said resins to be converted into higher polymers results in a failure to provide a fully water-insoluble coating.

On the other hand, some new attempts have been made to change water-soluble resins into water-insoluble forms by polymerization or crosslinkage of low molecular resins using an irradiation of electron rays on said resins. These methods are indeed more progressive than those previously proposed. However, when said irradiation is carried out in an air atmosphere, the velocity of polymerization and cross-linkage becomes remarkably slow, and the coated surface tends to remain somewhat tacky.

On the other hand, the above-mentioned irradiation carried out in an inert gas atmosphere is saved from such drawbacks. When, however, a steel sheet is continuously painted, it is difficult to reduce the amount of residual oxygen in the irradiation atmosphere to so low a level as to permit radical polymerization. Furthermore, the above-mentioned irradiation in an inert gas atmosphere consumes an enormous amount of inert gas and plant cost, proving to be an uneconomical process.

An object of this invention is to improve the known method of forming a corrosion-resistive coating consisting of a resin-chromate system on the surface of a steel sheet.

Another object of this invention is to easily obtain a steel sheet coated with a substrate layer having high resistivity to corrosion caused, for example, by alkali, and excellent paint adhesivity.

These objects can be attained by the method of this invention comprising the steps of applying a water solution of specific composition described hereinafter on the surface of a steel sheet followed by drying, and exposing the coated surface to ultraviolet in an air atmosphere to obtain a hardened coating; wherein said water solution contains a chemical compound which has been prepared by reacting a prepolymer of an epoxy resin with acrylic acid or methacrylic acid in order to introduce vinyl groups into the molecules of said prepolymer, another chemical compound of chromate or dichromate used for chelate formation and a molybdenum compound as a stabilizer of the water solution.

The above-mentioned objects can also be attained by a modification of this invention comprising the steps of applying a water solution of specific compositions described hereinafter on a metal surface, especially the surface of a steel sheet followed by drying, and exposing the coated surface to ultraviolet rays in an air atmosphere to obtain a hardened coating; wherein said water solution contains a chemical compound which has been prepared by reacting a prepolymer of an epoxy resin with acrylic acid or methacrylic acid together with phosphoric acid in order to introduce vinyl groups and phosphoric acid groups into the molecules of said prepolymer, another chemical compound of chromate or dichromate used for chelate formation and a molybdenum compound as a stabilizer of the water solution.

Of course, a mixture of two kinds of specific water solutions used in said modification can be as effectively applied as that of the preceding case.

The epoxy resins which can be effectively used in the present invention are as follows:
Bisphenol type;
Glycidyl ether type;
Glycidyl ester type;
Peracetic acid type;
Halogen type;
Novolak-phenol type; and
Polybutadiene type Most effective among the above-listed types is the bisphenol or novolak-phenol type.

The coating prepared by the method of this invention is characterized by excellent paint adhesivity, high resistance to corrosion caused, for example, by alkali, and freedom from tackiness. These preferable characteristics result from the facts that an epoxy resin prepolymer containing vinyl groups is oxidized by hexivalent chromium ions with the aid of energetic ultraviolet rays, the resultant radical polymerization renders the prepolymer water-insoluble, and, on the other hand trivalent chromium ions derived from said sexivalent ions act to form a resin-trivalent chromium ion-chelate complex which hardens the coating into a state free from tackiness.

As the radiation of ultraviolet rays on the coated surface can be carried out in an air atmosphere, the operation thereof becomes very simple. Therefore, the method of this invention can effectively and economically provide a steel sheet on which a coating consisting of a resin-chromate system is firmly deposited and renders said steel sheet, after painting, well adapted for press-molding or die-cutting without any possibility of the paint peeling off.

Hereinafter, we will explain this invention in full detail.

One form (1) of water soluble and polymerizable epoxy resin prepolymer used in this invention is prepared by reacting an epoxy resin prepolymer, for example, of the bisphenol or novolak-phenol type with acrylic acid or methacrylic acid to introduce double bonds of vinyl group type into the epoxy groups, and neutralize the reaction product with an amine.

Another form (2) of water soluble and polymerizable epoxy resin prepolymer also used in this invention is prepared by reacting an epoxy resin prepolymer, for example, of the bisphenol or novolak-phenol type with acrylic acid or methacrylic acid to introduce double bonds of vinyl group type into the epoxy groups and further reacting the reaction product with phosphoric acid and finally neutralizing the acidic product with an amine.

Both forms of (1) and (2) of water soluble epoxy resin prepolymer may be used separately or in combination.

Though irradiation of ultraviolet rays or electron rays attain the polymerization and hardening of the above-mentioned water-soluble prepolymers, yet the coating obtained is brittle, requiring a relatively long period of hardening, as about 20 seconds.

We have discovered that irradiation of ultraviolet rays in an air atmosphere causes a dried coating prepared from a water solution of (1) and/or (2) containing a salt of chromic acid to polymerize and harden due to the aforesaid chelate formation in as a short time as 3 to 5 seconds and presents a very tough and permanently stable form. However, addition of phosphoric acid to said water solution far more shortens the time of polymerization and hardening much more than otherwise. The coating obtained in either case does not dissolve into a common water soluble degreasing agent, (the pH value thereof being in the range of from 9 to 12,) at least for a period of 3 to 5 minutes. Further, the coating which has a very smooth, slidable surface is not easily torn off from the base metal during the succeeding pressing or punching process.

It is preferred that 1 mol of the prepolymer of epoxy resin be mixed with 1 to 3 mols of acrylic or methacrylic acid.

When a prepolymer more soluble in water than described above is desired, it is advised to react the prepolymer with polycarboxylic acid such as maleic acid, and then neutralize the solution with a solution of an amine.

The aforementioned prepolymer of epoxy resin, which has been reacted with acrylic acid or methacrylic acid, and further with phosphoric acid, becomes easily water soluble only by neutralization with an amine. Furthermore, introduction of phosphoric acid groups into the molecules of the aforesaid prepolymer promotes the reaction of $Cr^6$ $Cr^3$ tremendously during the irradiation of ultraviolet rays to shorten the period of polymerization and hardening and to increase the corrosion resistivity of the resultant coating.

It is preferred that 1 mol of the prepolymer of epoxy resin be mixed with 1 to 5 mols of phosphoric acid.

The kind and amount of amine used for the aforementioned neutralization which greatly affect the stability and corrosion resistivity of the prepolymer solution should be carefully determined, for example, by a sufficient number of preliminary experiments. In this connection, it is advised usually to use triethylamine, monomethylamine, diethylamine or ammonia.

It is preferred to add the aforesaid chromate solution to the water soluble prepolymer of epoxy resin reacted with acrylic or methacrylic acid, or further add phosphoric acid in such an amount as to cause the resultant prepolymer solution to have a pH value of 5 to 9. Practically, an almost neutralized ammoniacal water solution of ammonium bichromate, potassium bichromate or ammonium chromate is added to the prepolymer solution. For example, about 0.01 to 100 parts by weight of chromate are added to 100 parts by weight of the prepolymer of epoxy resin.

Depending upon the amount of chromate added and the amount of ultraviolet rays irradiated, hexavalent chromium ions will prominently remain in the coated layer. In this case, the coated layer presents a somewhat yellowish color and considerably high corrosion resistivity, but a tacky surface. When all of the chromium ions are changed into trivalent form, the coated layer is colorless or has a beautiful faintly green color. Thus, one of the features of this invention is that the coated layer can be freely controlled in color tone, corrosion resistivity, pressability and paint adhesivity.

One form of water solution of epoxy resin prepolymer whose molecules contain double bonds of a vinyl group, another form of said water solution which contains chromate ions, and a mixture of both forms have a pretty good stability. However, this stability depends upon the kind and amount of the basic amine added for neutralization of the solution as well as on the process of said addition. If it has high stability, the above-mentioned water solution will not show any abnormal deterioration during storage of even 30 days.

It has been found that addition of 5 to 7% by weight of water soluble compound of manganese or molybdenum to the aforesaid stabilizer solution prominently prolongs the storage time of said water solution and improves its corrosion resistivity. In a special case, when the stability of treating solution is particularly important, it is advised to reserve the solution of an epoxy resin prepolymer reacted with acrylic or methacrylic acid and that of chromate separately and mix both solutions in use. The same procedure can be followed when the epoxy resin prepolymer is also reacted with phosphoric acid.

An apparatus for irradiating ultraviolet rays may consist of a common high pressure mercury lamp emitting lights having a main wave length of 365 m$\mu$.

Processes for coating the treating solution on the surface of a steel sheet include, for example, a planar roll coating method, a grooved roller method, a spray-coating method and a method of dipping the steel sheet in the treating solution, followed by roll-coating.

Where ultraviolet rays are irradiated on the coated surface in an air atmosphere, the temperature of said atmosphere is not a matter of concern. It is interesting that a large amount of heat energy generated from an ultraviolet ray tube contributes considerably to the curing of resinous material.

The following examples illustrate the practice of the present invention.

EXAMPLE 1

A prepolymer of bisphenol-type epoxy resin (manufactured by Shell International Chemical Corporation, U.S.A. under a trademark "Epikote 1001") was reacted with acrylic acid.

Then the acrylate was further reacted with maleic anhydride, followed by neutralization with triethylamine. 50 parts by weight of ammonium dichromate were dissolved in pure water to provide 100 parts by weight of a treating solution.

After degreasing an electrolytically galvanized steel sheet using a common weak alkaline degreasing solution, followed by water-washing, the steel sheet was coated with the prepared treating solution by a grooved roller. The coated steel sheet was dried by hot air, and was irradiated by ultraviolet rays 5 seconds in an air atmosphere using an irradiating apparatus having two tubes each of 2 KW in order to polymerize and harden the coated layer.

The buildup of chromium coating was 50 mg/m$^2$. The coating became faintly yellow when not irradiated by ultraviolet rays, whereas colorless or faintly green when irradiated thereby. Furthermore, the sticky surface of the coated steel sheet appearing in the absence of the irradiation of ultraviolet rays vanished by said irradiation. A test of exposing a coated steel sheet sample to salt spray showed that these coated steel sheet samples, indicated so high corrosion resistivity as to generate no white or red rust even 450 hours after said test.

A cylindrical deep-drawn article 50 mm in inner diameter prepared from the electrolytically galvanized steel sheet of this example 90 mm in blank diameter was tested for press-moldability and resistance to a degreasing agent, using a suitable kind of press oil. Then the deep-drawn article was cleaned for 3 minutes by a degreasing agent solution containing about 30 g per liter of a surfactant, the pH value and the temperature of said solution being 12 and 65° C, respectively. After being washed with water and dried, the article was tested for corrosion resistivity and paint adhesivity. The salt spray exposure test of 120 hours produced white and red rusts on the entire surface of the article which was not irradiated by ultraviolet rays, but did not give rise to any rust on the surface of the irradiated article. Further, the irradiated article using melamine resin was demonstrated by test to show high paint adhesivity.

EXAMPLE 2

An electrolytically galvanized steel sheet previously treated with a common primary chromate solution was coated with a secondary treating solution of the same type as in Example 1. After being dried, the coated steel sheet was irradiated for 5 seconds by ultraviolet rays.

The secondary buildup of chromium coating (excepting the primary buildup thereof) was 30 mg/m$^2$. The coated steel sheet presented substantially as excellent moldability and paint adhesivity as in Example 1. The above-mentioned two-step chromate treating was found to improve the corrosion resistivity of the coated steel sheet even if the buildup of the secondary chromium coating was somewhat small.

EXAMPLE 3

A prepolymer of novolak-phenol type epoxy resin (trademark "DEN", Dow Chemical Corporation, U.S.A.) was made water soluble in the same manner as in Example 1. 25 parts by weight of water soluble prepolymer of novolak-phenol type epoxy resin acrylate, 25 parts by weight of said prepolymer further containing phosphoric acid groups, 16 parts by weight of ammonium bichromate and 3.2 parts by weight of ammonium molybdate were dissolved in pure water to provide 1000 parts by weight of a treating solution.

The surface of an electrolytically galvanized steel sheet coated with this reacting solution was exposed to ultraviolet rays to have the coated layer hardened. The coating thus hardened indicated the same degree of resistivity to corrosion and a degreasing agent as in Example 1.

EXAMPLE 4

A hot-galvanized steel sheet degreased by a common degreasing agent and thereafter washed with water was coated with the treating solution used in Example 3 by a grooved roller. After having been dried, the coated steel sheet was exposed to ultraviolet rays for 5 seconds to harden the coated layer. The corrosion resistivity test by means of the salt spray exposure method showed that the coated steel sheet did not present any white rust when exposed even 200 hours to the salt spray. In this case, the buildup of chromium coating was 20 mg/m$^2$.

EXAMPLE 5

A degreased cold-drawn steel sheet was coated with the same treating solution as in Example 3 using a grooved roller, followed by an irradiation of ultraviolet rays. The hardened coating indicated suitable physical properties including external appearance, corrosion resistivity and paint adhesivity for the subsequent application of paint on the surface of the coated steel sheet. In this case, the buildup of chromium coating was 60 mg/m$^2$.

EXAMPLE 6

A reaction of prepolymer of novolak-phenol type epoxyresin (trademark "DEN 438", Dow Chemical Corporation, U.S.A.) and acrylic acid was carried out, followed by addition of maleic anhydride and neutralization with monomethyl amine. 50 parts by weight of the product thus obtained, and 16 parts by weight of ammonium dichromate were dissolved into pure water to provide 1000 parts by weight of a treating solution.

The treating solution thus prepared was coated on an electrolytically galvanized steel sheet previously degreased by a common weak alkaline degreasing solution, followed by water washing. Then the coated steel sheet was dried by air, and was irradiated by ultraviolet rays for 5 seconds. The buildup of chromium coating was 50 mg/m$^2$.

In this case, hexavalent chromium was not sufficiently reduced to trivalent chromium. However, the coating presented extremely high corrosion resistivity and paint adhesivity.

Said coating, the prepolymer of which was free from a phosphoric acid group, indicated a somewhat lower alkali resistance than a coating, the prepolymer of which contained a phosphoric acid group.

What we claim is:

1. A method for forming a corrosion-resistant coating on a steel sheet which comprises applying a water solution on the surface of said steel sheet, followed by drying; and exposing the coated surface to ultraviolet rays having a main wave length of 365 mμ in an air atmosphere to obtain a cured coating; wherein said water solution contains a composition comprising (i) a prepolymer of an epoxy resin selected from the group consisting of bisphenol and novolak-phenol type reacted with an acid selected from the group consisting of acrylic acid and methacrylic acid, (ii) a chelate-forming compound selected from the group consisting of a chromate and a dichromate, and (iii) a water-soluble compound of molybdenum to stabilize said water solution.

2. A method of claim 1, wherein (i) comprises said prepolymer reacted with said acid and phosphoric acid.

3. A method of claim 1, wherein said water solution contains a mixture of a composition (A) comprising (i) a prepolymer of an epoxy resin selected from the group consisting of bisphenol and novolak-phenol type reacted with an acid selected from the group consisting of acrylic acid and methacrylic acid, (ii) a chelate-forming compound selected from the group consisting of a chromate and a dichromate, and (iii) a water-soluble compound of molybdenum to stabilize said water solution, and a composition (B) comprising (i) said prepolymer reacted with said acid and phosphoric acid, (ii) said chelate-forming compound, and (iii) said water-soluble compound of molybdenum.

4. The method of claim 1, wherein 1 mol of the prepolymer of epoxy resin is reacted with from 1 to 3 mols of acrylic or methacrylic acid.

5. The method of claim 2, wherein 1 mol of the prepolymer of epoxy resin is reacted with from 1 to 3 mols of acrylic or methacrylic acid and from 1 to 5 mols of phosphoric acid.

6. The method of claim 1, wherein said composition comprises 100 parts by weight of the prepolymer of epoxy resin and from 0.1 to 100 parts by weight of a chromate.

7. The method of claim 2, wherein said composition comprises 100 parts by weight of the prepolymer of epoxy resin and from 0.01 to 100 parts by weight of a chromate.

8. The method of claim 1, wherein said water solution contains from 5 to 7 percent by weight of said molybdenum compound based on the weight of said water solution.

9. The method of claim 2, wherein said water solution contains from 5 to 7 percent by weight of said molybdenum compound based on the weight of said water solution.

10. The method of claim 1, wherein a water solution of the prepolymer of epoxy resin reacted with acrylic acid or methacrylic acid and a water solution of a chromate are applied separately to said steel sheet.

11. The method of claim 2, wherein a water solution of the prepolymer of epoxy resin reacted with acrylic acid or methacrylic acid and phosphoric acid, and a water solution of a chromate are applied separately to said steel sheet.

12. The method of claim 1, wherein the water-soluble molybdenum compound is ammonium molybdate.

13. The method of claim 2, wherein the water-soluble molybdenum compound is ammonium molybdate.

14. The method of claim 3, wherein the water-soluble molybdenum compound is ammonium molybdate.

15. A steel sheet coated with a corrosion-resistant layer prepared by the method of claim 1.

16. A steel sheet coated with a corrosion-resistant layer prepared by the method of claim 2.

17. A steel sheet coated with a corrosion-resistant layer prepared by the method of claim 3.

* * * * *